United States Patent [19]

Svensson

[11] Patent Number: 5,031,967
[45] Date of Patent: Jul. 16, 1991

[54] BEARING DEVICE FOR A WHEEL HUB

[75] Inventor: Nicolas Svensson, Gothenburg, Sweden

[73] Assignee: AB Volvo, Gothenburg, Sweden

[21] Appl. No.: 532,698

[22] Filed: Jun. 4, 1990

[30] Foreign Application Priority Data

Jun. 12, 1989 [SE] Sweden .................................. 8902111

[51] Int. Cl.⁵ ...................... B60B 27/00; F16C 13/00
[52] U.S. Cl. ............................ 301/105 R; 301/124 R;
301/126; 384/461; 384/589
[58] Field of Search ............... 301/105 R, 124 R, 125,
301/126, 131; 277/35, 37; 384/461, 571, 589;
280/93, 96.1, 96.3, 188

[56] References Cited

U.S. PATENT DOCUMENTS

| | | | |
|---|---|---|---|
| 3,093,417 | 6/1963 | Bixby | 301/126 |
| 3,697,119 | 10/1972 | Van Wierst et al. | 295/49 |
| 4,079,799 | 3/1978 | Swan | 280/43 R |
| 4,381,874 | 5/1983 | Strader | 301/126 |
| 4,834,560 | 5/1989 | Jacob et al. | 384/461 |

FOREIGN PATENT DOCUMENTS 0272567 6/1988 European Pat. Off. .
636123 10/1936 Fed. Rep. of Germany .

Primary Examiner—Russell D. Stormer
Assistant Examiner—Cathleen Pringle
Attorney, Agent, or Firm—Young & Thompson

[57] ABSTRACT

The invention relates to a device for mounting a wheel hub (1) on a stub axle (2) of a non-driven wheel in a motor vehicle. The device comprises an outside bearing (5) in the vicinity of the outside free end of the stub axle (2) and an inside bearing (6) in the vicinity of the inside end of the stub axle (2) joined to a steering knuckle (3) or the like. According to the invention, the outside bearing (5) is an anti-friction bearing mounted between the interior surface of the wheel hub (1) and the stub axle (2) for absorbing both radial loads and axial loads, and the inside bearing (6) is an anti-friction bearing mounted between the exterior surface of the wheel hub (1) and the steering knuckle (3) or the like for absorbing only radial loads.

5 Claims, 1 Drawing Sheet

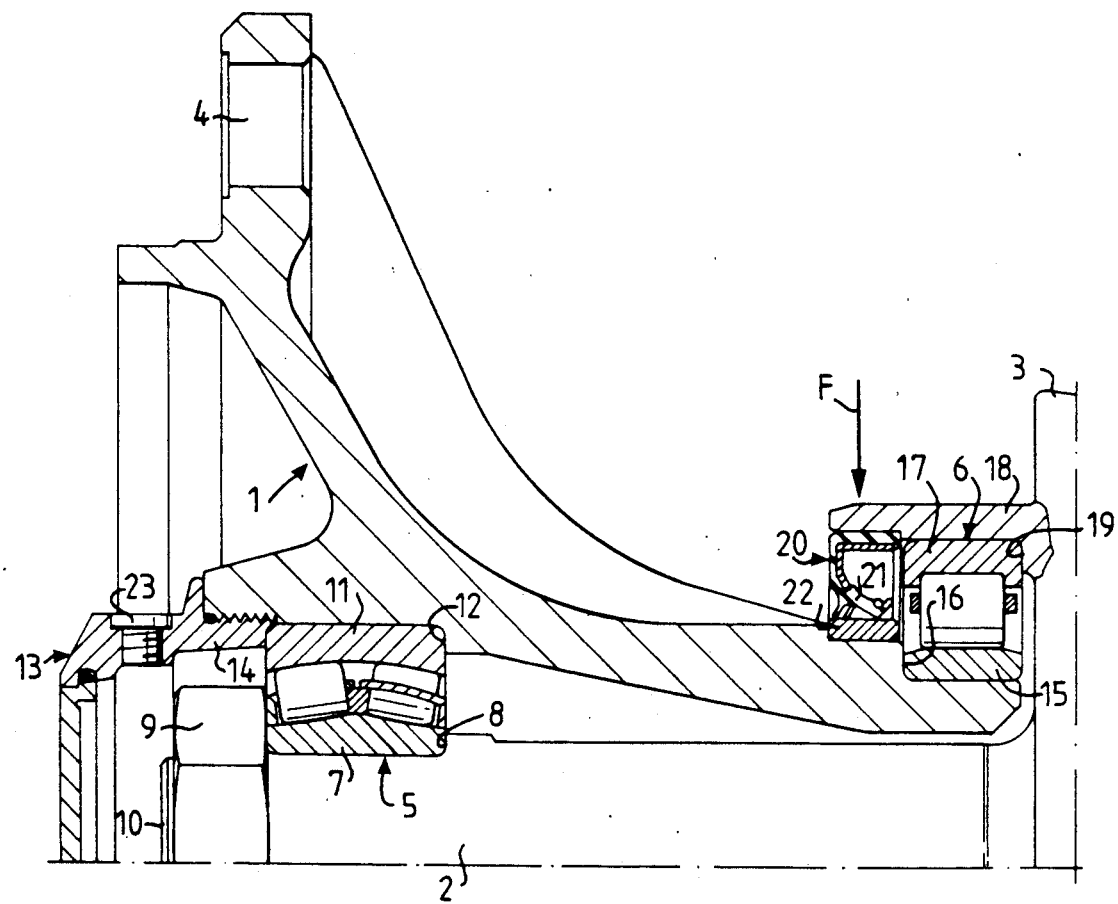

BEARING DEVICE FOR A WHEEL HUB

The invention relates to a device for mounting a wheel hub on a stub axle for a non-driven wheel in a motor vehicle, said device comprising an outside bearing in the vicinity of the outside, free end of the stub axle and an inside bearing in the vicinity of the inside end of the stub axle joined to a steering knuckle or the like. In this description, the terms "outside" and "inside", respectively, refer to placement relatively remote from or closer to, respectively, the longitudinal center line of the vehicle.

Up to now, for mounting a wheel hub on a stub axle, usually two taper roller bearings sloping towards each other have been used. The outer rings abut against shoulders in the wheel hub and the inner ring of the inside bearing abuts against a shoulder in the stub axle, while the inner ring of the outside bearing is pressed by means of a nut or similar locking means axially towards the inside bearing. There are spacer means between the inner rings of the two bearings. In order to achieve a correct bearing play, the nut on the stub axle must be tightened the correct amount. Furthermore, the manufacturing tolerances for the spacers between the two bearings are very small. The spacer means substantially increase the costs, and a number of different parts are required to lock the wheel hub in order to provide non-incremental adjustment of the bearing play, and this also increases the costs.

The invention is intended to provide a device of the type described by way of introduction which is simpler and is more easily mounted and which does not require any adjustment of the bearing play. This is achieved according to the invention by virtue of the fact that the outside bearing is an anti-friction bearing mounted between the interior surface of the wheel hub and the stub shaft for absorbing both radial loads and axial loads, and that the inside bearing is an anti-friction bearing mounted between the exterior surface of the wheel hub and the steering knuckle or the like for absorbing only radial loads.

Advantageous embodiments of the device according to the invention are disclosed in the subclaims.

The invention will be described in more detail below with reference to the accompanying drawing which shows an axial section through a portion of a wheel hub, a stub axle and a steering knuckle or the like in accordance with one embodiment of the invention.

The drawing shows a section through a portion of a wheel hub 1, which is intended for a front wheel or a trailing, i.e. non-driven, wheel for a motor vehicle, in this case a truck. The wheel hub 1 is supported on a stub axle 2, which extends from a steering knuckle 3 in the case of a front axle or a corresponding component if it is a trailing wheel shaft. The steering knuckle 3 or the corresponding component is a part of the vehicle wheel suspension (not shown). The wheel hub 1 is also provided at its outer portion with a number of bolt holes 4, of which only one is shown in the drawing, designed for mounting a rim (not snown).

The wheel hub 1 is mounted by means of an outside bearing 5 and an inside bearing 6. The outside bearing 5 is an anti-friction bearing which can absorb both radial loads and axial loads, and is, in the embodiment shown, a spherical roller bearing. The inside bearing 6 is an anti-friction bearing which can absorb only radial loads and is, in the embodiment shown, a cylindrical roller bearing.

The outside bearing 5 has its inner ring 7 mounted on the stub shaft 2 with one end abutting against a shoulder 8 on the stub shaft. A locking means in the form of a nut 9 screwed onto a threaded portion 10 of the stub shaft 2 presses against the other end surface of the inner ring 7, thus pressing the inner ring against the shoulder 8. The outer ring 11 of the outside bearing 5 is mounted in the wheel hub 1 and abuts with one end against a shoulder 12 in the wheel hub 1. The outer ring 11 is pressed against the shoulder 12 with the aid of a locking means in the form of a hub cap 13 which by means of an externally threaded extension 14 is screwed into the outside portion of the central hole in the wheel hub 1. The hub cap 13 thus has a double function, firstly, closing and sealing the inner space in the wheel hub 1 and, secondly, via the extension 14 pressing the outer ring 11 of the outside bearing 5 against the shoulder 12 in the wheel hub 1.

The inside bearing 6 is an anti-friction bearing which can only absorb radial loads, and in the embodiment shown it is a cylindrical roller bearing. The inner ring 15 of the inside bearing 6 is mounted on the exterior surface of the inside end of the wheel hub 1 and abuts against a shoulder 16 on the wheel hub 1. The outer ring 17 of the inside bearing 6 is mounted against the interior surface of a portion 18 which is concentric to the stub shaft 2 and extends over the inside end of the wheel hub 1. The outer ring 17 abuts against a shoulder 19 in the extending portion 18. Since the inside bearing 6 is only intended to absorb radial loads, no locking means are required to axially lock the inner ring 15 and the outer ring 17.

At the outside end of the inside bearing 6, i.e. on the side opposite to the steering knuckle 3, there is a sealing means 20 mounted in the projecting portion 18. The sealing means abuts with at least one sealing lip 21 against a wear ring 22, mounted on the wheel hub 1.

The bearings 5 and 6 are intended to be lubricated with oil, and for this purpose, the hub cap 13 is provided with a plug 23, which is inserted in a filler hole. After removal of the plug 23, oil can be filled through the filler hole to lubricate the bearings 5 and 6.

When mounting the wheel hub 1 on the stub shaft 2, the outside bearing 5 is mounted in the wheel hub 1 with the outer ring 11 abutting against the shoulder 12. The inner ring 15 of the inside bearing 6 is mounted on the wheel hub 1 in abutment with the shoulder 16. The remaining portion of the inside bearing 6 is mounted in the steering knuckle 3 or the corresponding component in abutment against the shoulder 19 as is the sealing means 20. All of these steps can be carried out as pre-assemblies. The wheel hub 1 is then slipped over the stub axle 2 until the bearings 5 and 6 are in place and the nut 9 is then screwed on and tightened so that the inner ring 7 of the outside bearing 5 comes into abutment against the shoulder on the stub axle 2. The hub cap 13 is mounted with its extension 14 abutting against the outer ring 11 of the outside bearing 5 and lubricant is injected. This completes the assembly, and no adjustment of the bearing play is required. The outside bearing 5 provides the correct position, while the inner bearing 6 permits a certain amount of manufacturing tolerance as regards axial variations of the wheel hub 1 relative to the stub axle 2 and the steering knuckle 3.

This is of course an appreciable advantage, since it saves time in assembly and is ergonomically advantageous. Another advantage is that it achieves a better distribution of load between the outside bearing and the inside bearing 6 due to the fact that the inside bearing can be moved inwards as a result of the fact that the sealing means 20 is placed outside the bearing 6. The inside bearing 6 only absorbs radial forces and is designed to take up the greatest radially directed load, since the resulting load acts in the direction of the arrow F. A further advantage is that the radial load which is absorbed by the inside bearing 6, is transmitted directly to the steering knuckle 3 or the corresponding component without affecting the stub axle 2, which means that the dimensions of the stub axle 2 can be reduced somewhat. At the same time, the dimensions of the wheel hub 1 can be reduced, which saves weight. Another advantage is that the sealing means 20 are stationary, which is not the case in previously known designs. This provides the advantage that the radial force pressing the sealing lip 21 against the wear ring will be constant regardless of the rotational speed of the wheel hub 1. With a rotating sealing ring, the radial force varies with the rotational speed, which means that high rotational speed can increase the risk of leakage.

I claim:

1. Device for mounting a wheel hub (1) on a stub axle (2) for a non-driven wheel in a motor vehicle, said device comprising an outside bearing (5) in the vicinity of the outside, free end of the stub axle (2) and an inside bearing (6) in the vicinity of the inside end of the stub axle (2) joined to a steering knuckle (3) or the like, characterized in that the outside bearing (5) is an anti-friction bearing mounted between the interior surface of the wheel hub (1) and the stub axle (2) for absorbing both radial loads and axial loads, and that the inside bearing (6) is an anti-friction bearing mounted between the exterior surface of the wheel hub (1) and the steering knuckle (3) or the like for absorbing only radial loads.

2. Device according to claim 1, characterized in that the outside bearing (5) is a spherical roller bearing, the inner ring (7) of which is mounted on the stub axle (2) and is clamped axially between a shoulder (8) on the stub axle (2) and a locking means (9), and the outer ring (11) of which is mounted in the wheel hub (1) and is clamped axially between a shoulder (12) in the wheel hub (1) and a locking means (14).

3. Device according to claim 1, characterized in that the inside bearing (6) is a cylindrical roller bearing, the inner ring (15) of which is mounted on the wheel hub (1) and the outer ring (17) of which is mounted in a portion (18) of the steering knuckle (3) or the like which extends over the inside portion of the wheel hub (1).

4. Device according to claim 2, characterized in that the locking means (9) for the inner ring (7) of the outside bearing (5) comprises a nut screwed onto the stub axle (2) and that the locking means (14) for the outer ring (11) of the outside bearing (5) comprises an extension of a hub cap (13) which is screwed into the wheel hub (1) and covers its open outside end.

5. Device according to claim 3, characterized in that a sealing means (20) is mounted externally to the outer ring (17) of the inside bearing (6) in the projecting portion (18) of the steering knuckle (3) or the like, said sealing means (20) abutting with a sealing lip (21) against the exterior surface of the wheel hub (1).

* * * * *